United States Patent
Branch et al.

(10) Patent No.: US 10,216,439 B2
(45) Date of Patent: Feb. 26, 2019

(54) PROTECTING UNALLOCATED DATA WITHIN A STORAGE VOLUME

(71) Applicant: International Business Machines Corporation, Armonk, NY (US)

(72) Inventors: Stephen M. Branch, Morgan Hill, CA (US); Harold S. Huber, Scottsdale, AZ (US); Michael J. Koester, Hollister, CA (US); Kevin L. Miner, Apopka, FL (US)

(73) Assignee: International Business Machines Corporation, Armonk, NY (US)

(*) Notice: Subject to any disclaimer, the term of this patent is extended or adjusted under 35 U.S.C. 154(b) by 89 days.

(21) Appl. No.: 15/013,918

(22) Filed: Feb. 2, 2016

(65) Prior Publication Data
US 2017/0220272 A1 Aug. 3, 2017

(51) Int. Cl.
G06F 3/06 (2006.01)
G06F 21/60 (2013.01)
G06F 21/78 (2013.01)

(52) U.S. Cl.
CPC ............ *G06F 3/0623* (2013.01); *G06F 3/064* (2013.01); *G06F 3/0652* (2013.01); *G06F 3/0676* (2013.01); *G06F 3/0685* (2013.01); *G06F 21/60* (2013.01); *G06F 21/78* (2013.01)

(58) Field of Classification Search
CPC .................. G06F 3/0652; G06F 12/14; G06F 12/1416–12/145
See application file for complete search history.

(56) References Cited

U.S. PATENT DOCUMENTS

| 8,850,105 | B2 | 9/2014 | Hida et al. |
| 2002/0103980 | A1* | 8/2002 | Crockett ............... G06F 3/0608 711/162 |
| 2009/0100221 | A1* | 4/2009 | Gabryjelski ..... G11B 20/00086 711/112 |
| 2009/0164715 | A1* | 6/2009 | Astigarraga ............ G06F 12/08 711/112 |
| 2011/0060863 | A1* | 3/2011 | Kimura ................. G06F 3/0611 711/103 |

(Continued)

FOREIGN PATENT DOCUMENTS

| CN | 104820575 A | 8/2015 |
| JP | H06214814 A | 8/1994 |

(Continued)

OTHER PUBLICATIONS

Black et al. "TRIM: Behavior of Subsequent READs." Sep. 2008. T10. T10/08-347r1.*

(Continued)

*Primary Examiner* — Nathan Sadler
(74) *Attorney, Agent, or Firm* — Zilka-Kotab, P.C.

(57) ABSTRACT

In one general embodiment, a computer-implemented method includes initializing a storage volume, receiving a request to secure unallocated data within the storage volume, sending a bit map to a hardware portion of the storage volume, in response to receiving the request, identifying unallocated data within the hardware portion of the storage volume utilizing the bit map, and marking the unallocated data as read inhibited within the hardware portion of the storage volume.

9 Claims, 5 Drawing Sheets

(56) References Cited

U.S. PATENT DOCUMENTS

| | | | |
|---|---|---|---|
| 2012/0246388 A1* | 9/2012 | Hashimoto | G06F 12/0246 |
| | | | 711/103 |
| 2013/0283381 A1 | 10/2013 | Thadikaran et al. | |
| 2014/0195725 A1* | 7/2014 | Bennett | G06F 12/0246 |
| | | | 711/103 |

FOREIGN PATENT DOCUMENTS

| | | | | |
|---|---|---|---|---|
| JP | 3154853 B2 | | 4/2001 | |
| KR | 10-2013-0057306 | * | 5/2013 | ............. G06F 12/00 |
| WO | WO 9120025 A1 | * | 12/1991 | ........... G06F 3/0601 |

OTHER PUBLICATIONS

Fred Knight. "SBC-3 Thin Provisioning Commands." Nov. 2008. T10. T10/08-149r1.*
Curtis E. Stevens, ed. "Information technology—ATA/ATAPI Command Set—2 (ACS-2)." Aug. 2009. INCITS. T13/2015-D. pp. 99-100.*
Seagate. "SCSI Commands Reference Manual." Apr. 2010. http://www.seagate.com/staticfiles/support/disc/manuals/Interface%20manuals/100293068c.pdf. pp. 145-146, 211-214.*
Translation of KR 10-2013-0057306. Jun. 2017.*
"Volume Table of Contents." Aug. 2014. https://en.wikipedia.org/w/index.php?title=Volume_Table_of_Contents&oldid=619507495.*
IBM. DFSMSdfp Advanced Services. 2014. Version 2. Release 1. SC23-6861-01. http://publibz.boulder.ibm.com/epubs/pdf/dgt3s301.pdf. pp. 1-73.*

* cited by examiner

PROTECTING UNALLOCATED DATA WITHIN A STORAGE VOLUME

BACKGROUND

The present invention relates to data management, and more specifically, this invention relates to securely managing residual data within a system.

Residual data management is an important security challenge. When a disk data set is deleted, the pointers to the data may be cleared, but the data itself may continue to exist as residual data on a portion of a disk drive to which it was first allocated. The risk of this data being read by unauthorized users is significant, and current solutions may negatively impact system performance through resource-intensive processes.

SUMMARY

A computer-implemented method according to one embodiment includes initializing a storage volume, receiving a request to secure unallocated data within the storage volume, sending a bit map to a hardware portion of the storage volume, in response to receiving the request, identifying unallocated data within the hardware portion of the storage volume utilizing the bit map, and marking the unallocated data as read inhibited within the hardware portion of the storage volume.

According to another embodiment, a computer program product for protecting unallocated data within a storage volume comprises a computer readable storage medium having program instructions embodied therewith, wherein the computer readable storage medium is not a transitory signal per se, and the program instructions are executable by a processor to cause the processor to perform a method. The method includes initializing, by the processor, a storage volume, receiving, by the processor, a request to secure unallocated data within the storage volume, sending, by the processor, a bit map to a hardware portion of the storage volume, in response to receiving the request, identifying, by the processor, unallocated data within the hardware portion of the storage volume utilizing the bit map, and marking, by the processor, the unallocated data as read inhibited within the hardware portion of the storage volume.

A system according to another embodiment includes a processor and logic integrated with and/or executable by the processor, where the logic is configured to initialize a storage volume, receive a request to secure unallocated data within the storage volume, send a bit map to a hardware portion of the storage volume, in response to receiving the request, identify unallocated data within the hardware portion of the storage volume utilizing the bit map, and mark the unallocated data as read inhibited within the hardware portion of the storage volume.

Other aspects and embodiments of the present invention will become apparent from the following detailed description, which, when taken in conjunction with the drawings, illustrate by way of example the principles of the invention.

DETAILED DESCRIPTION

Figure 1:
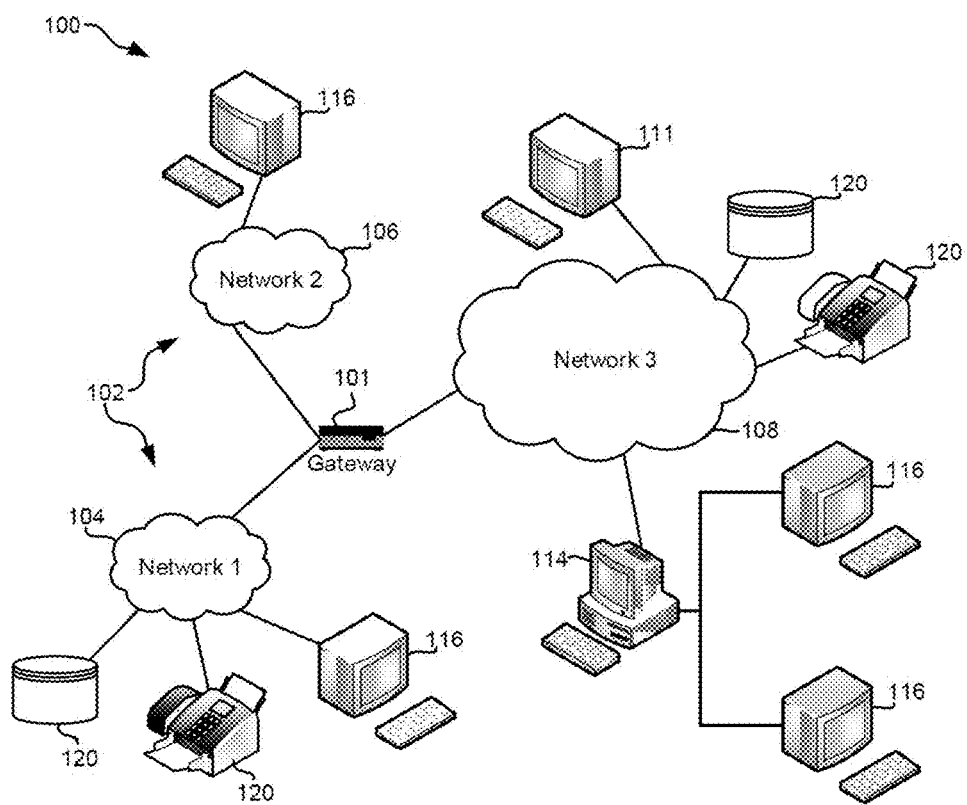
FIG. 1 illustrates a network architecture, in accordance with one embodiment.

The following description discloses several preferred embodiments of systems, methods and computer program products for protecting unallocated data within a storage volume. Various embodiments provide a method to notify hardware storage of unallocated data that can then be read inhibited.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for protecting unallocated data within a storage volume.

In one general embodiment, a computer-implemented method includes initializing a storage volume, receiving a request to secure unallocated data within the storage volume, sending a bit map to a hardware portion of the storage volume, in response to receiving the request, identifying unallocated data within the hardware portion of the storage volume utilizing the bit map, and marking the unallocated data as read inhibited within the hardware portion of the storage volume.

In another general embodiment, a computer program product for protecting unallocated data within a storage volume comprises a computer readable storage medium having program instructions embodied therewith, wherein the computer readable storage medium is not a transitory signal per se, and the program instructions are executable by a processor to cause the processor to perform a method. The method includes initializing, by the processor, a storage volume, receiving, by the processor, a request to secure unallocated data within the storage volume, sending, by the processor, a bit map to a hardware portion of the storage volume, in response to receiving the request, identifying, by the processor, unallocated data within the hardware portion of the storage volume utilizing the bit map, and marking, by the processor, the unallocated data as read inhibited within the hardware portion of the storage volume.

In another general embodiment, a system includes a processor and logic integrated with and/or executable by the processor, where the logic is configured to initialize a storage volume, receive a request to secure unallocated data within the storage volume, send a bit map to a hardware portion of the storage volume, in response to receiving the request, identify unallocated data within the hardware portion of the storage volume utilizing the bit map, and mark the unallocated data as read inhibited within the hardware portion of the storage volume.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
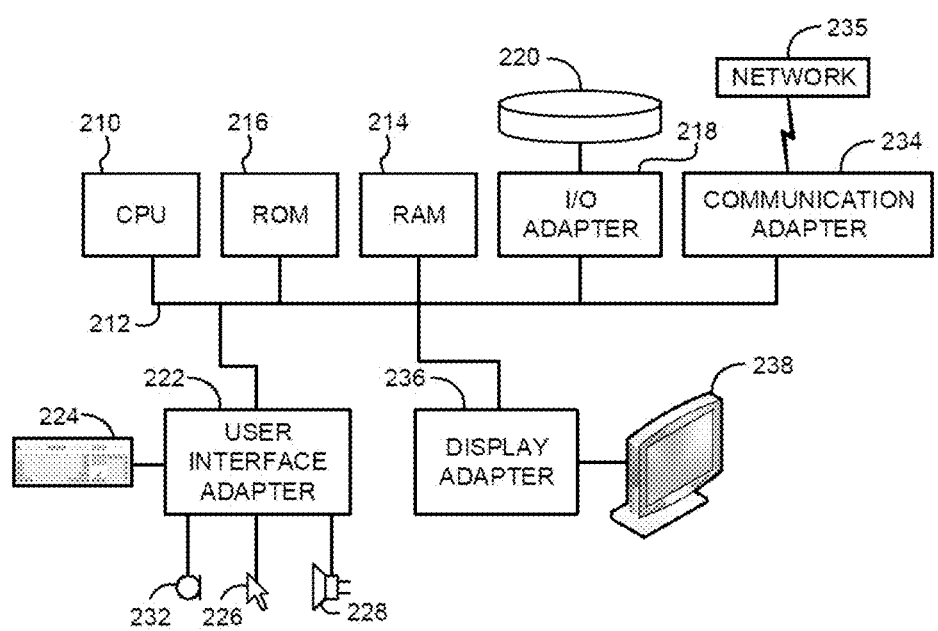
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
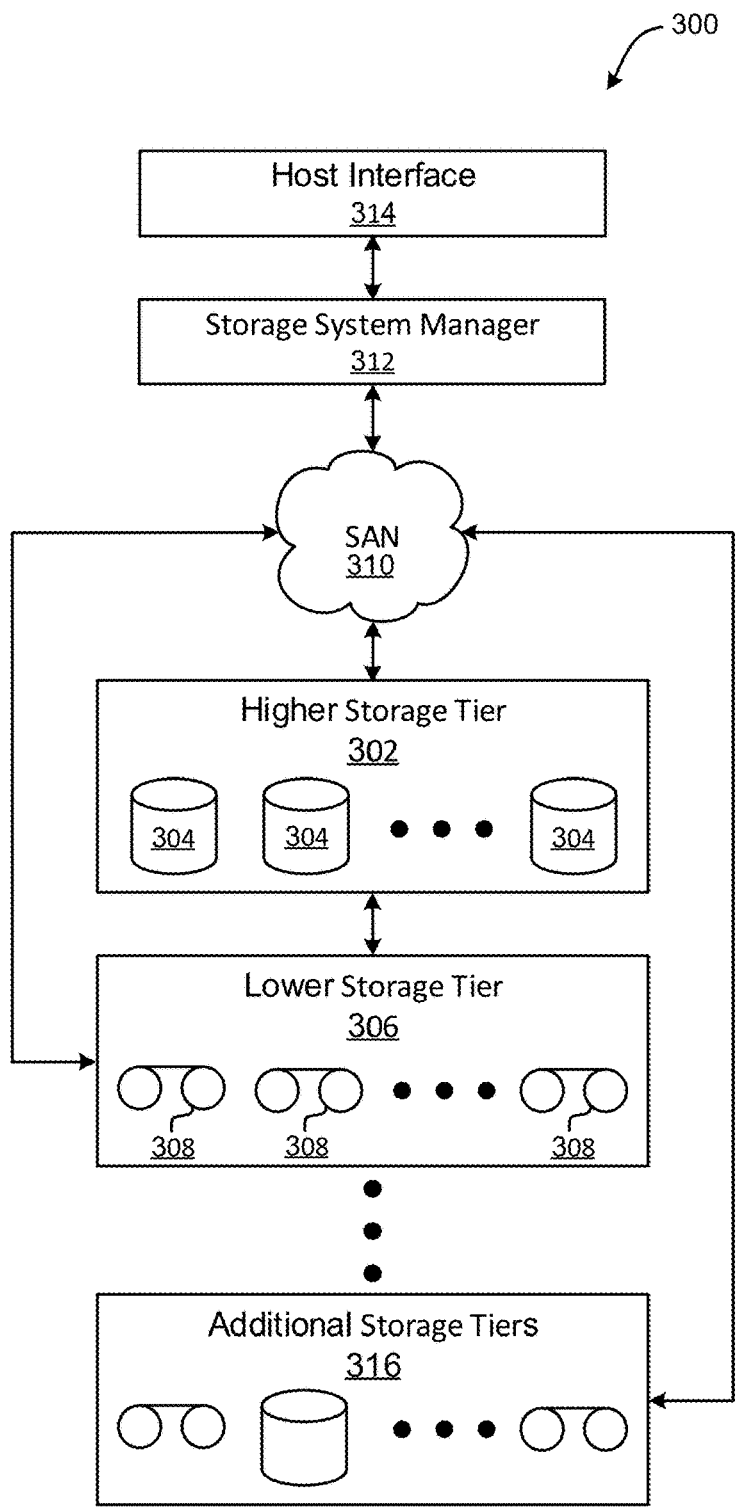
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
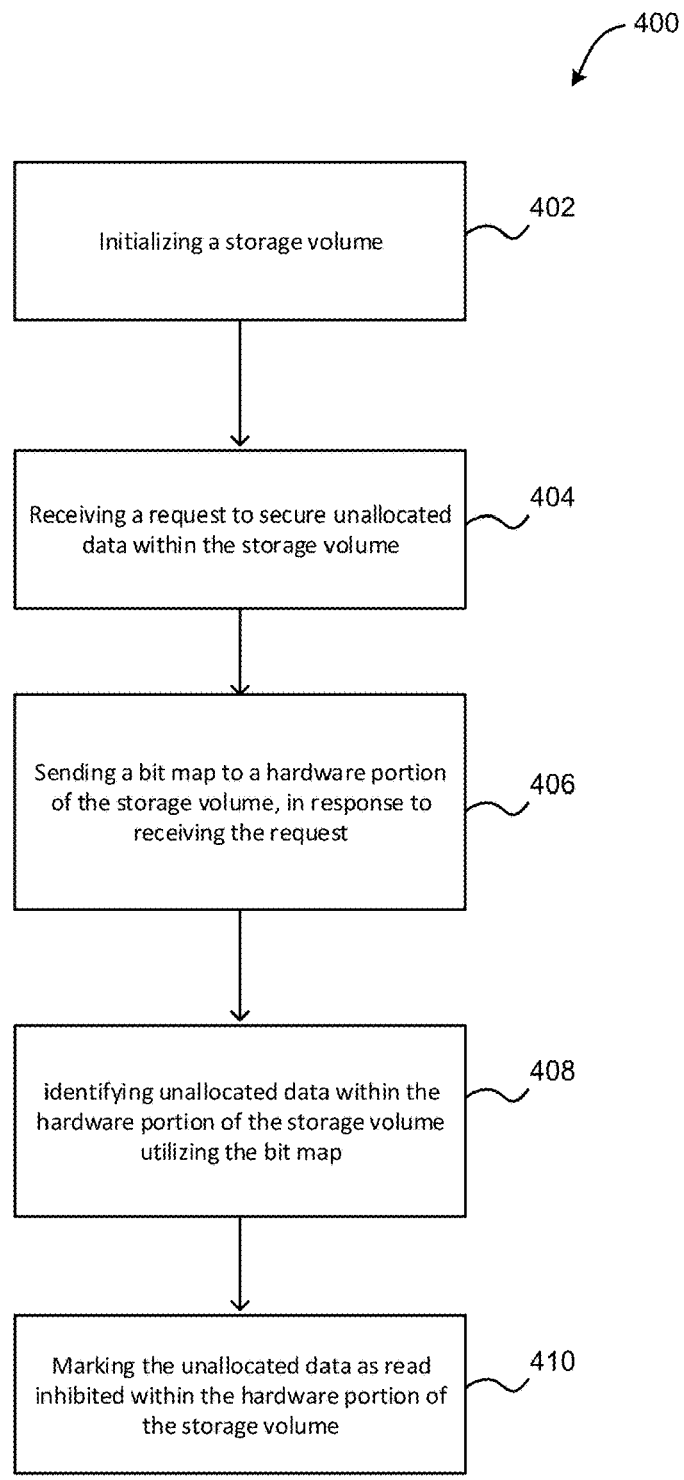
FIG. 4 illustrates a method for protecting unallocated data within a storage volume, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a storage volume is initialized. In one embodiment, the storage volume may be included within a system that may include one or more computing devices (e.g., one or more servers, personal computers, mobile computing devices, etc.). In yet another embodiment, the system may be included within a cluster of additional systems (e.g., a sysplex, etc.). In another embodiment, the storage volume may include both hardware and software elements. For example, the storage volume may include hardware elements capable of storing data within the system. For example, the storage volume may include physical storage having a plurality of physical storage tracks, such as one or more hard disk drives, one or more storage computers one or more database servers, etc. In another example, the storage volume may include software that maintains and/or manages one or more portions of the storage volume (e.g., a volume table of contents (VTOC) for the storage volume, etc.).

Additionally, in one embodiment, the storage volume may be initialized in response to a request for the storage volume. For example, a user within the system may request additional storage within the system, and the storage volume may be provided to the user in response to the request. In another embodiment, the storage volume may be one of a plurality of storage volumes within the system.

Further, as shown in FIG. 4, method 400 may proceed with operation 404, where a request is received to secure unallocated data within the storage volume. In one embodiment, the request may be created by a user of the system. For example, the user may explicitly request that unallocated data within the system be protected. In another embodiment, the unallocated data may include storage space (e.g., one or more storage tracks, etc.) located within a portion the storage volume that is not currently being used by the system to store one or more records.

For example, when one or more records (e.g., any data capable of being stored within the storage volume) are requested to be stored, created, modified, or otherwise altered within the storage volume, one or more portions of the hardware portion of the storage volume (e.g., one or more storage tracks, etc.) may be utilized (e.g., allocated, etc.) by the system to store data constituting the records. In another example, when one or more records are requested to be removed from the storage volume, one or more portions of the storage volume being utilized to store the data constituting such records (e.g., the one or more hardware tracks, etc.) may be freed (e.g., marked as unallocated, etc.) within the storage volume. In yet another example, when the storage volume is initialized, all data within the hardware portion of the storage volume that is not explicitly stored in response to one or more requests (e.g., write requests, modify requests, etc.) may be marked as unallocated data.

Further still, as shown in FIG. 4, method 400 may proceed with operation 406, where a bit map is sent to a hardware portion of the storage volume, in response to receiving the request. In one embodiment, the bit map may include a table of contents for the storage volume. For example, the bit map may include a volume table of contents (VTOC) for the storage volume, an allocation map, a free space map, a track bit map, etc. In another embodiment, the bit map may indicate which data within the storage volume is allocated and which data within the storage volume is unallocated.

Also, in one embodiment, the bit map may be managed by software within the storage volume. For example, the bit map may be stored within one or more predetermined storage tracks within the storage volume (e.g., the first 64 k tracks on the storage volume, etc.). In another embodiment, the bit map may include metadata. For example, the bit map may include one or more of names of data sets stored within the storage volume, a size of each of the data sets, a location of each of the data sets, one or more permissions associated with each of the data sets, etc.

In addition, in one embodiment, the bit map may be sent to the hardware portion of the storage volume by a software portion of the storage volume. For example, the bit map may be sent to the physical storage of the storage volume by software managing the bit map within the storage volume.

Furthermore, as shown in FIG. 4, method 400 may proceed with operation 408, where the unallocated data within the hardware portion of the storage volume is identified utilizing the bit map. In one embodiment, the bit map may include metadata including a location of all unallocated data within the hardware portion of the storage volume. In another embodiment, the hardware portion of the storage volume may use the metadata to identify the unallocated data within the hardware portion of the storage volume.

Further still, as shown in FIG. 4, method 400 may proceed with operation 410, where the unallocated data is marked as read inhibited within the hardware portion of the storage volume. In one embodiment, the hardware portion of the storage volume may mark the unallocated data as read inhibited. In another embodiment, data marked as read inhibited within the hardware portion of the storage volume may be prevented from being read within the storage volume. For example, in response for a request to read data stored within the storage volume, it may be determined whether the data is read inhibited. In another example, in response to a determination that the requested data is read inhibited, the read request may be denied by the storage volume.

Also, in one embodiment, the unallocated data marked as read inhibited may be written to within the hardware portion of the storage volume. For example, data may be written over the unallocated data (e.g., the data may be written to the hardware portion of the storage volume where the unallocated data is stored, etc.). Also, in one embodiment, all unallocated data within the storage volume may be marked as read inhibited when the storage volume is initialized, and such read inhibiting may be changed to allow reads on data once the unallocated data becomes allocated data.

In this way, data stored within the storage volume may be protected after it is deleted and the tracks storing the data within the hardware portion of the storage volume are marked as unallocated, without having to explicitly write over all unallocated data within the hardware portion of the storage volume.

Figure 5:
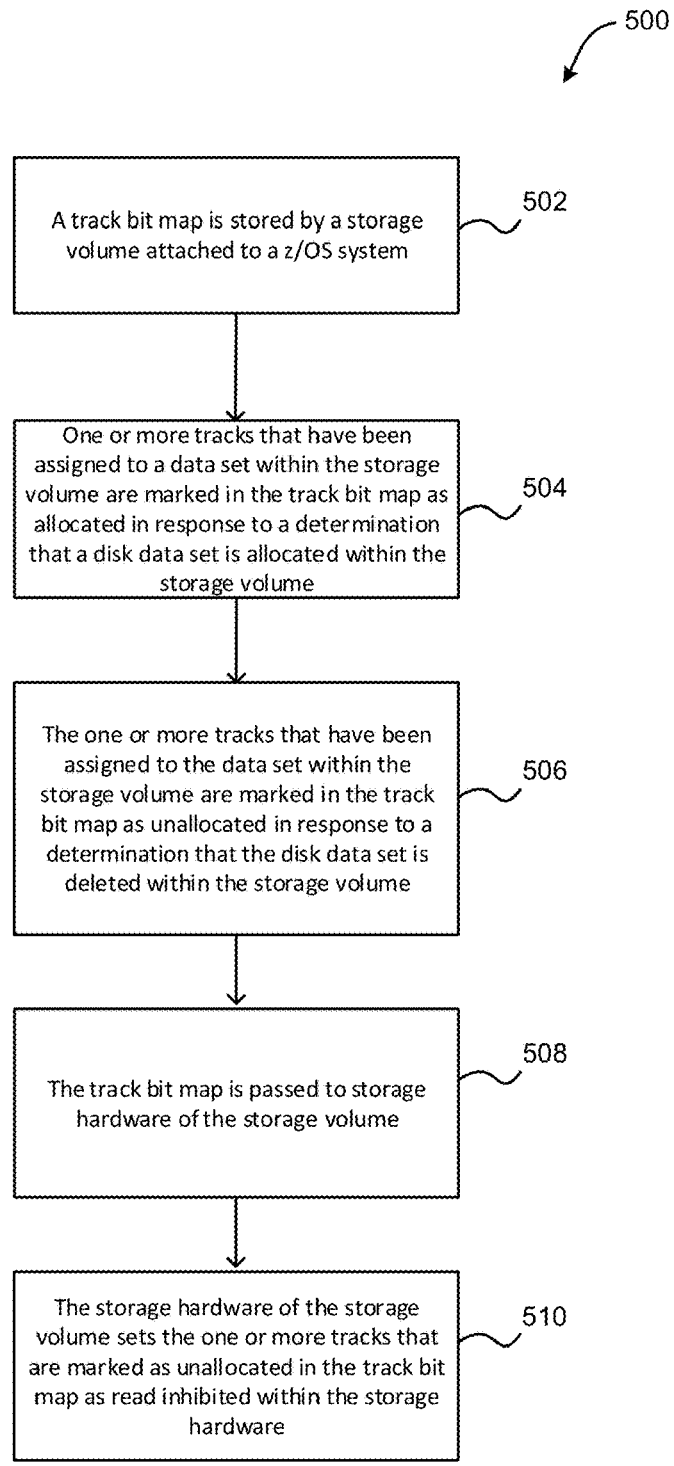
FIG. 5 illustrates a method for read inhibiting unallocated tracks within a system, in accordance with one embodiment.

Now referring to FIG. 5, a flowchart of a method 500 for read inhibiting unallocated tracks within a system is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a track bit map is stored by a storage volume attached to a z/OS system. In one embodiment, the track bit map may be maintained by software within the z/OS system. For example, the track bit map may be maintained by software within a VTOC of the storage volume. In another embodiment, the track bit map may indicate both an allocated space and a free space on the storage volume. In yet another embodiment, a track bit map may be stored by each of a plurality of storage volumes each attached to a different z/OS system.

Further still, method 500 may proceed with operation 504, where one or more tracks that have been assigned to a data set within the storage volume are marked in the track bit map as allocated in response to a determination that a disk data set is allocated within the storage volume. Further, as shown in operation 506, the one or more tracks that have been assigned to the data set within the storage volume are marked in the track bit map as unallocated in response to a determination that the disk data set is deleted within the storage volume. For example, when the data set is deleted, these bits may be reset to indicate that these tracks are now free space.

Further still, as shown in operation 508, the track bit map is passed to storage hardware of the storage volume. In one embodiment, the software within the z/OS system that maintains the track bit map within the z/OS system may send the track bit map to the storage hardware of the storage volume.

Also, as shown in operation 510, the storage hardware of the storage volume sets the one or more tracks that are marked as unallocated in the track bit map as read inhibited within the storage hardware. In one embodiment, setting the one or more tracks as read inhibited may prevent data from the one or more tracks from being returned by the storage hardware in response to a request for the data on the one or more tracks.

Further, in one embodiment, storage volumes attached to z/OS systems may contain a track bit map that may be maintained by software, and which may indicate both the allocated and unallocated space on the volume. In another embodiment, this map may be used in the same manner as an 00S bit map maintained by storage hardware. In yet another embodiment, when a volume is initialized for use on a z/OS system there may be an option that may allow a user (e.g., a system administrator, a storage administrator, etc.) to specify that they want unallocated tracks to be read inhibited.

Further still, in one embodiment, software within the storage volume may pass this track bit map location to the hardware portion of the storage volume. The hardware portion may use this bit map to determine which tracks are unallocated and are to be set as read inhibited. Write I/O to unallocated tracks within the hardware portion of the storage volume may be honored by the hardware portion of the storage volume, but read I/O may be command rejected with sense indicating that these tracks are read inhibited. A command may also be made available to hardware that may allow an authorized user to reset the read inhibit for the device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   in response to an initialization of a hard disk drive portion of a storage volume, marking, by the hard disk drive portion of the storage volume, all data within the hard disk drive portion of the storage volume that is not explicitly stored in response to one or more write requests and one or more modify requests as unallocated data;
   receiving, at the hard disk drive portion of the storage volume from a software portion of the storage volume, a bit map maintained by the software portion of the storage volume within a volume table of contents (VTOC) of the storage volume, where the bit map includes:
      metadata describing names of data sets stored within the storage volume, a size of each of the data sets, a location of each of the data sets, and one or more permissions associated with each of the data sets,
      a first plurality of tracks of the hard disk drive portion of the storage volume that are marked as allocated, and
      a second plurality of tracks of the hard disk drive portion of the storage volume that are marked as unallocated;
   identifying, la the hard disk drive portion of the storage volume, the second plurality of tracks of the hard disk drive portion of the storage volume that are marked as unallocated, utilizing the bit map;
   marking, by the hard disk drive portion of the storage volume, the second plurality of tracks of the hard disk drive portion of the storage volume as read inhibited within the hard disk drive portion of the storage volume;
   receiving, at the hard disk drive portion of the storage volume, a request to read data stored at the second plurality of tracks of the hard disk drive portion of the storage volume;
   determining, by the hard disk drive portion of the storage volume, that the second plurality of tracks of the hard disk drive portion of the storage volume are set as read inhibited;
   denying, by the hard disk drive portion of the storage volume, the request to read the data stored at the second plurality of tracks of the hard disk drive portion of the storage volume, in response to the determining;
   returning, by the hard disk drive portion of the storage volume, an indication that the second plurality of tracks of the hardware portion of the storage volume are read inhibited, in response to the determining;
   receiving, by the hard disk drive portion of the storage volume, a request to write new data to the second plurality of tracks of the hard disk drive portion of the storage volume;
   writing, by the hard disk drive portion of the storage volume, the new data to the second plurality of tracks of the hard disk drive portion of the storage volume; and
   changing, by the hard disk drive portion of the storage volume, the read inhibited marking of the second plurality of tracks of the hard disk drive portion of the storage volume to allow reads on the data stored at the second plurality of tracks of the hard disk drive portion of the storage volume.

2. The computer-implemented method of claim 1, wherein the second plurality of tracks of the hardware portion of the storage volume that are marked as unallocated includes storage space located within the storage volume that is not currently being used by a system to store one or more records.

3. The computer-implemented method of claim 1, further comprising:
   receiving a second request to read data stored at the first plurality of tracks of the hardware portion of the storage volume; and
   allowing the second request to read the data stored at the first plurality of tracks of the hardware portion of the storage volume, in response to determining that the data stored at the first plurality of tracks of the hardware portion of the storage volume is not read inhibited.

4. The computer-implemented method of claim 1, wherein the bit map is stored within one or more predetermined storage tracks within the hard disk drive portion of the storage volume.

5. A system, comprising:
   a hard disk drive portion of a storage volume, the hard disk drive portion
   configured to:
      in response to an initialization of the hard disk drive portion of the storage volume, mark, by the hard disk drive portion of the storage volume, all data within the hard disk drive portion of the storage volume that is not explicitly stored in response to one or more write requests and one or more modify requests as unallocated data;
      receive, at the hard disk drive portion of the storage volume from a software portion of the storage volume, a bit map maintained by the software portion of the storage volume within a volume table of contents (VTOC) of the storage volume, where the bit map includes:
         metadata describing names of data sets stored within the storage volume, a size of each of the data sets, a location of each of the data sets, and one or more permissions associated with each of the data sets,
         a first plurality of tracks of the hardware portion of the storage volume that are marked as allocated, and
         a second plurality of tracks of the hardware portion of the storage volume that are marked as unallocated;
      identify, by the hard disk drive portion of the storage volume, the second plurality of tracks of the hard disk drive portion of the storage volume that are marked as unallocated, utilizing the bit map;

mark, by the hard disk drive portion of the storage volume, the second plurality of tracks of the hard disk drive portion of the storage volume as read inhibited within the hard disk drive portion of the storage volume;

receive, at the hard disk drive portion of the storage volume, a request to read data stored at one or more of the second plurality of tracks of the hard disk drive portion of the storage volume;

determine, by the hard disk drive portion of the storage volume, that the one or more of the second plurality of tracks of the hard disk drive portion of the storage volume are set as read inhibited;

deny, by the hard disk drive portion of the storage volume, the request to read the data stored at the second plurality of tracks of the hard disk drive portion of the storage volume, in response to the determining;

return, by the hard disk drive portion of the storage volume, an indication that the second plurality of tracks of the hardware portion of the storage volume are read inhibited, in response to the determining;

receive, by the hard disk drive portion of the storage volume, a request to write new data to the second plurality of tracks of the hard disk drive portion of the storage volume;

write, by the hard disk drive portion of the storage volume, the new data to the second plurality of tracks of the hard disk drive portion of the storage volume; and change, by the hard disk drive portion of the storage volume, the read inhibited marking of the second plurality of tracks of the hard disk drive portion of the storage volume to allow reads on the data stored at the second plurality of tracks of the hard disk drive portion of the storage volume.

6. A computer program product for protecting unallocated data within a storage volume, the computer program product comprising a computer readable storage medium having program instructions embodied therewith, wherein the computer readable storage medium is not a transitory signal per se, the program instructions executable by a processor to cause the processor to perform a method comprising:

in response to an initialization of a hard disk drive portion of a storage volume, marking, by the processor at the hard disk drive portion of the storage volume, all data within the hard disk drive portion of the storage volume that is not explicitly stored in response to one or more write requests and one or more modify requests as unallocated data;

receiving, by the processor at the hard disk drive portion of the storage volume from a software portion of the storage volume, a bit map maintained by the software portion of the storage volume within a volume table of contents (VTOC) of the storage volume, where the bit map includes:
 metadata describing names of data sets stored within the storage volume, a size of each of the data sets, a location of each of the data sets, and one or more permissions associated with each of the data sets,
 a first plurality of tracks of the hard disk drive portion of the storage volume that are marked as allocated, and
 a second plurality of tracks of the hard disk drive portion of the storage volume that are marked as unallocated;

identifying, by the processor at the hard disk drive portion of the storage volume, the second plurality of tracks of the hardware portion of the storage volume that are marked as unallocated, utilizing the bit map;

marking, by the processor at the hard disk drive portion of the storage volume, the second plurality of tracks of the hard disk drive portion of the storage volume as read inhibited within the hard disk drive portion of the storage volume;

receiving, by the processor at the hard disk drive portion of the storage volume, a request to read data stored at the second plurality of tracks of the hard disk drive portion of the storage volume;

determining, by the processor at the hard disk drive portion of the storage volume, that the second plurality of tracks of the hard disk drive portion of the storage volume are set as read inhibited;

denying, by the processor at the hard disk drive portion of the storage volume, the request to read the data stored at the second plurality of tracks of the hard disk drive portion of the storage volume, in response to the determining;

returning, by the processor at the hard disk drive portion of the storage volume, an indication that the second plurality of tracks of the hardware portion of the storage volume are read inhibited, in response to the determining;

receiving, by the processor at the hard disk drive portion of the storage volume, a request to write new data to the second plurality of tracks of the hard disk drive portion of the storage volume;

writing, by the processor at the hard disk drive portion of the storage volume, the new data to the second plurality of tracks of the hard disk drive portion of the storage volume; and changing, by the processor at the hard disk drive portion of the storage volume, the read inhibited marking of the second plurality of tracks of the hard disk drive portion of the storage volume to allow reads on the data stored at the second plurality of tracks of the hard disk drive portion of the storage volume.

7. The computer program product of claim 6, wherein the second plurality of tracks of the hardware portion of the storage volume that are marked as unallocated includes storage space located within the storage volume that is not currently being used by a system to store one or more records.

8. The computer program product of claim 6, further comprising:
 receiving, by the processor, a second request to read data stored at the first plurality of tracks of the hardware portion of the storage volume; and
 allowing, by the processor, the second request to read the data stored at the first plurality of tracks of the hardware portion of the storage volume, in response to determining that the data stored at the first plurality of tracks of the hardware portion of the storage volume is not read inhibited.

9. The computer program product of claim 6, wherein the bit map is stored within one or more predetermined storage tracks within the hard disk drive portion of the storage volume.

* * * * *